(12) United States Patent
Rosenberg et al.

(10) Patent No.: US 7,016,375 B1
(45) Date of Patent: Mar. 21, 2006

(54) INTEGRATED CONNECTION ADMISSION CONTROL AND BANDWIDTH ON DEMAND FOR A ACCESS ASYNCHRONOUS NETWORK

(75) Inventors: Catherine Rosenberg, Danbury (GB); Hosame Hassan Abu-Amara, Richardson, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/349,347

(22) Filed: Jul. 7, 1999

(51) Int. Cl.
*H04J 3/16* (2006.01)
*H04J 3/22* (2006.01)
*H04L 12/28* (2006.01)
*H04L 12/56* (2006.01)

(52) U.S. Cl. .............. 370/468; 370/230; 370/235
(58) Field of Classification Search .......... 370/230, 370/395.2–395.31, 229, 468, 465, 235
See application file for complete search history.

(56) References Cited

U.S. PATENT DOCUMENTS

| | | | | |
|---|---|---|---|---|
| 5,357,507 | A | 10/1994 | Hughes et al. ............ | 370/60 |
| 5,917,804 | A * | 6/1999 | Shah et al. .............. | 370/230 |
| 5,996,019 | A * | 11/1999 | Hauser et al. ........... | 709/235 |
| 6,157,654 | A * | 12/2000 | Davis ...................... | 370/412 |
| 6,222,823 | B1 * | 4/2001 | Smith et al. ............. | 370/230 |
| 6,240,066 | B1 * | 5/2001 | Nagarajan et al. ....... | 370/230 |
| 6,324,165 | B1 * | 11/2001 | Fan et al. ................. | 370/232 |
| 6,408,005 | B1 * | 6/2002 | Fan et al. ................. | 370/412 |

FOREIGN PATENT DOCUMENTS

| | | |
|---|---|---|
| EP | 0658999 | 12/1994 |
| EP | 0522391 | 6/1997 |
| EP | 0790751 | 8/1997 |
| EP | 0814632 | 12/1997 |
| WO | WO97/22224 | 6/1997 |

OTHER PUBLICATIONS

Iwata, ATM Routing Algorithms with Multiple QoS Requirements for Multimedia Internetworking, Aug. 1996, IEICE Trans., p. 999-1007.*
Guerin, Equivalent Capacity and Its Application to Bandwidth Allocation in High-Speed Networks, Sep. 1991, IEEE Journal on Selected Areas in Communications, vol. 9, No. 7, p. 968-981.*

* cited by examiner

*Primary Examiner*—Chi Pham
*Assistant Examiner*—Ronald Abelson
(74) *Attorney, Agent, or Firm*—Barnes & Thornburg

(57) ABSTRACT

An integrated connection admission control (CAC) and bandwidth on demand control (BoD) system for allocating the resource of a common medium uplink of a multiple access (MA) asynchronous network segment, wherein the CAC allocates static resource to all virtual connections (VCs) or groupings of VCs accepted by the CAC and books dynamic resource to the VCs or groupings of VCs that require guaranteed dynamic resource, and the BoD allocates dynamic resource to VCs or to groupings of VCs requesting dynamic resource in such a way that all VCs or groupings of VCs requesting dynamic resource are dynamically allocated requested dynamic resource up to at least the guaranteed dynamic resource which has been booked for them by the CAC.

42 Claims, 1 Drawing Sheet

SA = Statically Allocated
BA = Booked

INTEGRATED CONNECTION ADMISSION CONTROL AND BANDWIDTH ON DEMAND FOR A ACCESS ASYNCHRONOUS NETWORK

FIELD OF THE INVENTION

The present invention relates to the integration of Connection Admission Controllers (CAC) and Bandwidth on Demand Controllers (BoD) on networks which have at least one asynchronous multiple access (MA) network segment. The term asynchronous is used to denote ATM networks and other cell relay systems which guarantee Quality of Service to some types of connections.

In a multiple access (MA) network, ie. a network which contains at least one MA segment, users of a MA segment share a common medium uplink to access the network. For example, users in a MA segment may share a common radio uplink to a satellite so that each user dispersed over a geographical region is able to communicate with the satellite over the link. The common medium uplink may be time divided (TDMA) and so comprise a plurality of time-slots (TS), where a time-slot carries information, also known as traffic, from one user only and the traffic from one user may require more than one time-slot. Alternatively, the common medium uplink may be frequency divided (FDMA) and comprise a plurality of frequency channels. More common is multi frequency time division (MF-TDMA), in which the common medium uplink is divided into a plurality of frequency channels, each of which is divided into time-slots and traffic from a user is allocated to a certain number of time-slot/frequency channel pairs. A further alternative is code division (CDMA). In this document the term time-slot (TS) will be used to designate slots from TDMA, FDMA, MF-TDMA, CDMA and other multiple access division techniques.

Examples of MA segments are satellite networks, wireless networks, return path systems for satellites, passive optical networks, adhoc networks and cable networks.

The users in a MA segment communicate with the multiple access network using the common medium uplink via a subscriber access unit (SAU). A SAU may comprise, for example, a terminal which connects an individual user to the network or a concentrator, which connects a group of users (such as a LAN) to the network.

The common medium uplink connects the users in the MA segment with a headend, which is essentially a switch with several inputs (the uplinks) and several outputs and possibly interheadend links (see later). The headend will retransmit the traffic towards its destination on the network via point-to-point links except in the case of a satellite system with on-board processor switch in which case it is via downlinks. The downlinks from the headend (i.e. the satellite) are generally dedicated links which transport traffic from the headend to destination terminals or concentrators of the MA segment or to other networks via gateways. The downlinks may be point-to-multipoint, ie, broadcast, so that each user in the MA segment can receive traffic carried on the downlink. The downlink to a gateway will generally be point-to-point. There may be many headends connected to each other via inter-headend links (IHL). In the case of a satellite system where the satellite is not buffering cells, the headends are effectively the gateways and the satellite becomes irrelevant from a CAC/BoD perspective.

We will in the following deal with 2 cases. The/first one (referred to as case 1 in the following) corresponds to the situation where the headend is ground-based and so does not have limited buffer space that requires protection. The second case, is where the headend is satellite based (i.e., is a switch in the sky) and its buffers have limited capacity and so require specific protection.

A network control centre (NCC) controls and manages the communications within the multiple access network. The headend and NCC may be co-located, however, when the headend is a satellite, the headend and the NCC can be separated with an appropriate division of functionality between the headend and the NCC. This allows the NCC to be ground based because a satellite will have very tight processing power and buffer space constraints. There may be more than one NCC per MA segment.

Control of asynchronous networks is generally implemented using call or connection admission and policing. Call or connection admission control (CAC) is a network process that receives as input a connection admission request that specifies the traffic descriptor and quality of services (QoS) requirements of the connection and returns a response granting or denying the admission request. The CAC must ensure that the network meets its end-to-end quality of services (QoS) guarantees to connections that are admitted to the network. Therefore, in global networks, CAC is required in both directions of communication for each MA segment and for each point-to-point network over which the requested connection extends. A connection is rejected if at least one of the switches along the network path over which the connection extends does not have the resource to accommodate it.

A further control system required for MA segments only is the bandwidth on demand (BoD) process which enables a connection to request the resources it requires (eg. extra time slots) on a demand basis while the connection is already in progress in a MA segment where many bursty connections share a common medium uplink. This process can be useful for real time connections if it yields acceptable latency (ie. response time). It is particularly useful for non real time connections.

BoD will generally be invoked many times during the progress of a single connection, while CAC is usually invoked only once, at the connection set-up, for every connection on the network.

Policing is required to ensure that connections do not violate the traffic descriptors declared by the connections during set-up. These traffic descriptors are used by the CAC to determine whether to accept the connections. Clearly, if the declared traffic descriptors are not adhered to by the connection, QoS is compromised.

It will be clear that CAC, BoD and policing are intricately interconnected in the design of MA networks offering QoS guarantees to connections. The interconnection and interaction between the CAC, BoD and policing have to be carefully designed in order to generate a MA network which is viable and efficient. In particular, it is important that time-slots are used efficiently to enable the resource in the common medium uplink to be used to its best effect so that the number of users that can be supported by the uplink is maximised (ie. offer a good Grade of Service (GoS)) while guaranteeing QoS.

In some MA networks CAC and BoD are performed in the headend, in other networks CAC and BoD are performed in NCCs, or alternatively CAC and BoD are split between headends and NCCs.

OBJECT OF THE INVENTION

The present invention seeks to provide improved integration of CAC and BoD controllers in a MA network which overcomes or at least mitigates one or more of the problems noted above. It is sought to increase the traffic carrying capacity of the common medium whilst complying with the constraints in the headend, particularly when processing and buffer space in the headend is limited because, for example, it is a satellite. It is also sought to couple the CAC for the common medium uplink with the BoD for the common medium uplink in order to provide both QoS to services and efficiency to the system.

SUMMARY OF THE INVENTION

Therefore, according to a first aspect of the present invention there is provided an integrated connection admission control (CAC) and bandwidth on demand control (BoD) system for allocating the resource of a common medium uplink of a multiple access (MA) asynchronous network segment, wherein;

the CAC comprises means for allocating static resource (possibly zero) to all virtual channels (VCs) or groupings of VCs accepted by the CAC, and means for booking dynamic resource (possibly zero) to VCs or groupings of VCs that require guaranteed dynamic resource, and the BoD comprises means for allocating dynamic resource to VCs or groupings of VCs requesting dynamic resource in such a way that all VCs or groupings of VCs requesting dynamic resource are dynamically allocated requested dynamic resource up to at least the guaranteed dynamic resource booked for them by the CAC.

Having at least a proportion of the dynamic resource pre-booked by the CAC enables the common medium uplink to deliver quality of service (QoS) to subscribers because it ensures that each VC (or grouping of VCs) will always get the minimum resource it needs. However, by not allocating the booked resource statically and instead allowing the BoD to allocate the booked resource dynamically, any pre-booked dynamic resource that is not needed by a VC or a group of VCs can be reallocated dynamically as extra resource to any other VCs or groups of VCs, within the shared medium uplink, that do need it. By allocating the static resource and booking dynamic resource to a group of VCs within the same SAU, the CAC can take advantage of intra SAU multiplexing.

It should be noted that different types of VCs, having, for example, different ATM transfer capabilities will be reserved by the CAC different amounts of static and guaranteed dynamic resource. For example, a CBR (Constant Bit Rate) connection or a rt-VBR (real time-Variable Bit Rate), which are real time connections will generally be allocated static resource only, ie. they will not use BoD. However if the latency of the BoD process allows it, they can use BoD (especially for rt-VBR) and will then be reserved guaranteed dynamic resource and may also rely on a share of the best effort dynamic resource as well. Other VC types, for example, Unspecified Bit Rate (UBR), will generally be reserved zero static resource, and may also be reserved zero guaranteed dynamic resource, but instead will have to make do with a share of the remainder or best effort dynamic resource which the BoD is able to allocate to it. Nrt-VBR (non real time-Variable Bit Rate) may be allocated static resource, may be reserved guaranteed dynamic resource and may also rely on a share of the best effort dynamic resource as well. These are system specific examples of how resource would be booked and allocated to a VC (or a group of VCs) and would depend, for example, on propagation delay in the system.

It is preferred, in order to simplify processing in the integrated CAC and BoD system that the CAC reserves static resource for a VC when a VC is set up for the duration of the connection associated with the VC. Similarly, it is preferred that the CAC reserves when applicable booked dynamic resource to a VC when a VC is set up for the duration of the connection associated with the VC. Alternatively, the CAC can reserve when applicable static resource and booked dynamic resource to a group of VCs within the same SAU and change the amount of static resource and/or booked dynamic resource when new connections are set up or when connections are released within the group.

In order not to exceed the total resource capacity of the medium access uplink the CAC will only accept a VC, designated j, which requires a static resource of $SR_j$ and a booked dynamic resource of $BR_j$ when;

$$SR_j + BR_j + \sum_{k=1}^{K} SR_k + \sum_{k=1}^{K} BR_k \leq C_T$$

where $C_T$ is the total resource capacity of the common medium uplink and there are K existing VCs (VC k for k=1, . . . , K) using the uplink and each VC k has static resource $SR_k$ and booked dynamic resource $BR_k$ reserved to them by the CAC.

Note that VC j could also be discarded because there is not enough capacity in the subscriber access unit SAU or because the maximum rate of the SAU would be exceeded if the connection was accepted. This last condition can be written:

$$SR_j + BR_j + \sum_{k=1}^{m} SR_k + \sum_{k=1}^{m} BR_k \leq C_{SAU}$$

where $C_{SAU}$ is the maximum resource capacity of the SAU and there are m existing VCs (VC k for k=1, . . . , m) in the SAU and each VC k has static resource $SR_k$ and booked dynamic resource $BR_k$ reserved to them by the CAC.

It is preferred that the BoD allocates dynamic resource on a periodic basis. Furthermore, it is preferred that during a current period the CAC allocates resource for new VCs or groups of VCs and releases resource from released VCs or groups of VCs for the next period and the BoD allocates dynamic resource for the next period to VCs or groups of VCs requesting dynamic resource for the next period. A VC (or group of VCs) using BoD will request resource in a periodic fashion when it needs resource on top of its static resource (SR).

In order to simplify processing and to ensure an efficient allocation each period, depending on the status of the network for that period the allocations made by the BoD for the next period can be independent of the allocations made by the BoD for the current period. We will then say that the BoD is memoryless.

Alternatively the BoD can have a memory and remember for each VC (or group of VCs) the amount of dynamic resource which it cannot allocate in the current period and increment the request for dynamic resource made on behalf of this VC (or group of VCs) for the next period by this amount.

It should be noted that the booked dynamic resource for a group of VCs can be equal to the sum of the booked dynamic resource reserved for each of the VCs in the group or can be less to take advantage of intra-SAU statistical multiplexing.

Preferably, the BoD allocates dynamic resource to VCs or groups of VCs according to the following rules;
  when the requested resource (incremented or not depending on whether the BoD is with or without memory) from the VC or group of VCs is less than or equal to the booked dynamic resource for the VC or group of VCs, the BoD allocates the VC or group of VCs all of the requested resource,
  when the requested resource from the VC or group of VCs is greater than the booked dynamic resource for the VC or group of VCs, the BoD allocates the VC or group of VCs the booked dynamic resource and additionally the BoD allocates the VC or group of VCs a share of the remainder of the requested resource, from the remaining resource capacity of the common medium uplink.

This ensures that the BoD complies with the resource bookings made by the CAC and so the BoD will not allocate resource in a way which compromises the Quality of Service guaranteed by the CAC, whilst giving the BoD freedom to allocate the remainder of the resource dynamically so that utilisation of the uplink is optimised. It should be noted that it is envisaged that a VC or group of VCs may be allocated a zero share of the remainder of the requested resource.

To enable the BoD to further optimise utilisation of the uplink, it is preferred that the share of the remainder of the requested resource for each VC or group of VCs (herein referred to as the best effort allocated resource, BE for each VC or group of VCs), is allocated by maximising the sum of the natural logarithms of all the BEs, subject to the conditions that;
  the BE allocated to each VC or group of VCs is less than or equal to the remainder of the requested resource for that VC or group of VCs, and
  the sum of all the BEs is less than or equal to the remaining resource capacity of the common medium uplink.

As an equivalent alternative to maximising the sum of the natural logs of all the BEs, the product of all the BEs can be maximised.

There may be further conditions to this optimisation problem, because in a MF-TDMA common medium uplink, time-slots cannot be allocated to the same SAU simultaneously on different frequency channels. Also, SAUs will have a maximum rate at which they can transmit and receive traffic. The BE allocated to the VCs or groups of VCs originating from the same terminal must take these factors into account.

In case 2 of an on board switch satellite system, to guarantee quality of service while providing efficiency for a complete headend comprising many uplinks and many downlinks, further conditions may need to be taken into account. Global maximisation of the sum of the natural logs of the BEs over the whole set of uplinks may be necessary to maintain the queues in the buffers of the headend for the downlinks at levels which will prevent loss of traffic cells in the headend. This is especially useful if there is insufficient processing power in the headend to provide policing and reshaping in the headend, but is also useful even if there is policing and reshaping in the headend, because cell loss is reduced. It allows the CAC process to be handled on the basis of static resource and booked dynamic resource only.

Accordingly, in case 2 where for a complete headend there are multiple uplinks and multiple downlinks controlled by the BoD, it is preferred that the BEs for each uplink are allocated by the BoD by maximising the sum of the log of the BE over the whole set of uplinks subject to the conditions that the sum of all the BEs of a given uplink is less than or equal to the remaining resource capacity of the uplink, for each uplink and the sum of all the BEs for a given downlink is less than or equal to the remaining resource capacity of the downlink, for each downlink and the BE allocated to each VC or group of VCs is less than or equal to the remainder of the requested resource for that VC or group of VCs. The other conditions specific to the terminal would also need to be taken into account if applicable. In order to perform this computation, the resource requests have to indicate implicitly or explicitly the uplink and the downlink to which they correspond.

According to a second embodiment of the present invention an allocation table setting out resource allocation on the common medium uplink is controlled partly by the CAC when allocating static resource (and possibly booking guaranteed dynamic resource) and is controlled partly by the BoD when allocating dynamic resource. This provides an efficient way to integrate CAC and BoD activities and share the responsibility of the allocation table in a scalable manner. Thus, it is preferred that the CAC periodically allocates static resource and books guaranteed dynamic resource in the table and then forwards the table to the BoD for the BoD to allocate dynamic resource in the table. It is further preferred that the BoD periodically transmits the completed allocation table, which contains the allocations made by the CAC and the BoD for the next period (possibly shifted by the appropriate propagation delay) to all SAUs.

The CAC is generally VC based and so fills up the allocation table on a per VC basis (however it is possible for the CAC to allocate static resource and booked dynamic resource on a per group of VCs basis) and the BoD is generally per group of VC based in terms of the computation of shared resources and usually (but not necessarily) will create an allocation table referring to the same kind of grouping used in the computation. Hence the CAC and the BoD use a consistent philosophy for grouping VCs. For example, the CAC will generally be per connection based and so will fill up the allocation table by allocating or booking each connection a plurality of time-slots to a connection. Hence the allocation table sent by the CAC to the BoD will indicate for each TS allocated by the CAC the identity of the VC (or possibly the grouping of VCs). If the BoD sends an allocation table to the SAUs based on SAU identity then, it will transform the allocation table sent by the CAC by replacing the identity of each VC with the identity of the corresponding SAU. The BoD will also, if the grouping done by CAC and by the BoD are not the same, make the necessary transformation to get the values of the static rate and booked rate that it needs for each of its grouping. For example if the CAC provides the BoD a allocation table which is VC based and the BoD does its computation on a SAU basis, then the booked resource for the VCs from each SAU will be summed to calculate the booked resource for each SAU. Then the BoD will perform the allocation of dynamic resource on a per SAU basis, by allocating each SAU time-slots in the allocation table, from the available dynamic resource. This BoD allocation takes into account each SAU's booked dynamic resource which has been guaranteed by the CAC on a per connection basis.

Note that the way in which the CAC places the static TS in the allocation table can minimise jitter for real time connections. The BoD will have to obey the allocation table sent to it by the CAC by not re-arranging these TS, i.e., by allocating these TS to the SAU corresponding to the VC to which the TS is allocated by the CAC. For the booked TS, it may be better to allow the BoD to re-arrange TS as long as it gives the same amount to each SAU. Alternatively, the CAC can book and place the guaranteed dynamic resource to indicate to the BoD where to find time-slots to use if the resources are requested. It should be noted that if jitter is not a problem, for example because the duration of each successive allocation table is small, then there may be no need for the CAC to place any TS. In that case, the CAC needs only to send the number of static and booked TS to the BoD.

When the headend to which traffic on the uplink is transmitted has low buffer space and processing space, for example, when the headend is a satellite with an on board switch, according to a third aspect of the present invention the CAC and BoD are constrained to allocate resource in such a way that traffic on the common medium access uplink is shaped by the integrated CAC and BoD resource allocation system. The shaping of traffic by the integrated CAC and BoD ensures that the traffic entering the headend complies with the constraints of the ingress of the headend due, in particular, to the low buffer space.

In the above a VC is a connection. The groups of VCs referred to will generally have the same source (eg. the same SAU or terminal), may have the same ATM transfer capability, may have the same network destination (for example the same output queue in the headend) or may have the same ATM transfer capability and the same network destination.

The request of resource may be made in terms of a cell rate that will later be transformed by the BoD to a number of allocated time-slots on the common medium uplink. Alternatively, the allocation of resource may be made directly in terms of an allocation of time-slots.

According to a further aspect of the present invention there is provided a method of integrating a connection admission control (CAC) and a bandwidth on demand control (BoD) for allocating the resource of a common medium uplink of a multiple access (MA) asynchronous network segment, comprising the steps of;

the CAC allocating static resource to all virtual connections (VCs) accepted by the CAC on a per VC or per grouping of VC basis, the CAC booking dynamic resource to the VCs that require guaranteed dynamic resource on a per VC or per grouping of VC basis, and the BoD allocating dynamic resource to VCs or to groupings of VCs requesting dynamic resource on top of their static resource on a need basis in such a way that all VCs or groupings of VCs requesting dynamic resource are dynamically allocated requested dynamic resource up to at least the guaranteed dynamic resource which has been booked for them by the CAC.

Preferably, the step of allocating dynamic resource comprises the steps of;

the BoD allocating the VC or group of VCs all of the requested resource when the requested resource from the VC or group of VCs is less than or equal to the booked dynamic resource for the VC or group of VCs, and the BoD allocating the VC or group of VCs the booked dynamic resource and additionally a share of the remainder of the requested resource from the remaining resource capacity of the common medium uplink when the requested resource from the VC or group of VCs is greater than the booked dynamic resource for the VC or group of VCs.

According to a further aspect of the present invention there is provided a method of integrating a connection admission control (CAC) and a bandwidth on demand control (BoD) system for allocating the resource of a common medium uplink of a multiple access (MA) asynchronous network segment, which comprises the steps of the CAC allocating static resource and booking guaranteed dynamic resource and the BoD allocating dynamic resource and additionally comprising the steps of filling out an allocation table setting out resource allocation on the common medium access uplink in such a way that the table is controlled by the CAC when allocating static resource and booking dynamic resource and is controlled by the BoD when allocating dynamic resource.

According to a further aspect of the present invention there is provided a method of integrating a connection admission control (CAC) and a bandwidth on demand control (BoD) system for allocating the resource of a common medium uplink of a multiple access (MA) asynchronous network segment, in which the CAC and BoD are constrained to allocate resource in such a way that traffic on the common medium access uplink is shaped by the integrated CAC and BoD resource allocation system.

BRIEF DESCRIPTION OF THE DRAWINGS

The present invention will now be described in relation to the accompanying Figures in which;

FIG. 2 shows the periodic timing of the processing conducted by the CAC and BoD, with the time arrow (t) going from left to right. Part of the resource is allocated and booked in an allocation table by a CAC controller. The table is periodically updated, in time periods P. The periodically filled allocation table is sent from the CAC to the BoD controller, periodically as shown by arrows (2). Booked resource as well as left over resource are then allocated in the allocation table by the BoD controller, periodically in periods that could be equal to P. The BoD will then broadcast the allocation table to the SAUs or terminals, periodically as shown by arrows (4). The allocation table will be effective as soon as it arrives at the terminals, i.e., after a propagation delay.

Figure 3:
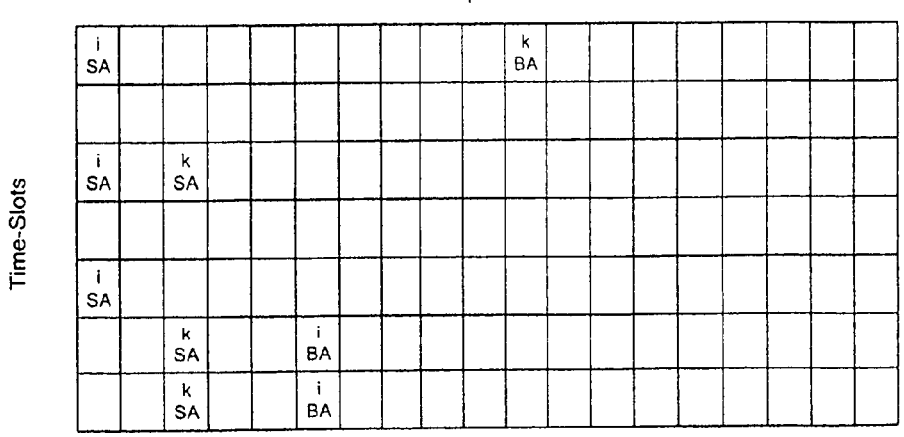
FIG. 3 is a schematic representation of part of the CAC allocation table.

An example of a part of a CAC allocation table is shown in FIG. 3. In the CAC allocation table each box represents a time-slot of a MF-TDMA common medium uplink. The different frequencies of the uplink form the columns of the table and the different timings of the uplink form the rows of the table. The CAC has allocated a connection i with three time-slots of static allocation $SA_i$ and has reserved the connection i three time-slots of booked dynamic allocation $BA_i$. Similarly, the CAC has allocated a connection k with three time-slots of static allocation $SA_k$ but has reserved the connection k only one time-slot of booked dynamic allocation $BA_k$. Note that as discussed before, the CAC could have allocated SA and BA on a group basis and in this case, the identities of the groups would be in each box.

In the following the request for resource is made in terms of a cell rate, (eg. X cells per second) that will later be transformed by the CAC and BoD to a number of allocated time-slots on the common medium uplink Alternatively, the resource requests could be directly made in terms of TS.

Applications running on the network will use one of the following ATM transfer capabilities: CBR (Constant Bit Rate); rt-VBR (real time—Variable Bit Rate); nrt-VBR (non-real time—Variable Bit Rate); ABR (Available Bit Rate); GFR (Guaranteed Frame Rate); ABT (ATM Block Transfer); UBR (Unspecified Bit Rate) or UBR+. Applications using CBR and rt-VBR are real time applications, the remainder are not. Traffic descriptors are declared by a connection depending on its transfer capabilities and its QoS requirements.

At the set-up of a connection j, from an SAU, a request for connection is made to the CAC on the common medium uplink. The CAC determines whether it is able to accept the connection on the uplink (depending on the status of the CAC allocation table as is discussed below) and if it can it will allocate to the connection j a static amount of rate $SR_j$ on the uplink and reserve to the connection a booked rate $BR_j$ (see below). The static rate $SR_j$ is allocated to the connection j for the duration of the connection. The booked rate $BR_j$ is reserved to the connection j for the duration of the connection. When connection j is terminated the CAC will release the rate $SR_j$ and $BR_j$ (see below). It should be noted that the static rate allocated to a connection and the booked rate reserved to a connection could be zero.

It should also be noted that if the CAC allocates SR and BR on a group basis, then at the call set-up (and at call release), the CAC will decide to which group the new or released connection belongs and how to update the SR and BR of this group. If no appropriate group exists then the CAC has to create one.

The connection j will have an associated traffic descriptor (depending on its ATM transfer capability) and a requested QoS and depending on these characteristics of the connection j, the CAC will allocate an appropriate amount of static rate $SR_j$. For example, $SR_j$ could be the Peak Cell Rate (PCR) for a CBR connection. The rate $SR_j$ is chosen by the CAC and it is completely under CAC management.

The connections that are of a transfer capability that do not use BoD, eg. real time connections, will generally only receive static rate SR, but this is system specific and depends on the propagation delay of the system.

For connections that will use the BoD, the CAC will allocate a booked rate $BR_j$ to the connection j which is again dependent on the characteristics of the connection j and that can again be group based. This booked rate could be zero for some connections. The booked rate $BR_j$ will be reserved to connection j for its duration until the connection j is terminated, in which case the booked rate $BR_j$ will be released. Alternatively, it will be reserved for the group and updated at each new arrival or release within the group. Depending on the traffic descriptor and QoS associated with connection j, $BR_j$ if connection based could be between zero and $PCR_j$-$SR_j$.

The following discussion assumes for clarity sake only that the CAC and the BoD are connection based (VC based) and so the BoD allocates rate to individual connections j in response to requests from individual connections j.

The allocation of the booked rate, which has been booked by the CAC controller is controlled by the BoD controller. The booked rate $BR_j$ is reserved by the CAC for connection j, so that if connection j requests this booked rate or less than the booked rate from the BoD controller for the common medium uplink, it is sure to get it. If for a period a connection j does not ask for its complete allocation of booked rate, then the remainder of the booked rate is made available for other connections using the same uplink to use on a best effort (BE) basis.

Having this booked rate enables the delivery of QoS to subscribers by making sure each connection will always get the rate it needs. The advantage of not allocating the booked rate, $BR_j$ statically is that when not needed it can be made available to any other connections within the same uplink.

As indicated above, the CAC on the shared medium uplink will only accept a call j if it has sufficient capacity. That is, if the sum of what is to be statically allocated to connection j (ie. $SR_j$) and what is to be booked for connection j (ie. $BR_j$) is less than the total remaining capacity of the uplink, ie. If $$SR_j + BR_j + \sum_{k=1}^{K} SR_k + \sum_{k=1}^{K} BR_k \leq C_T \qquad (1)$$

where $C_T$ is the total capacity of the shared medium uplink available for traffic and there are K existing connections which have varied static resource $SR_k$ allocated to them and varied booked rate $BR_k$ allocated to them by the CAC where k=1,2,3, . . . , K. Equation (1) may not be the only condition which the CAC must take into account when deciding to admit a connection because other aspects of the uplink, such as rules for allocating time-slots and aspects of the terminals (in particular the transmit and receive rate of the terminals) may add additional constraints.

In particular, VC j could be discarded because there is not enough capacity in the SAU or because the maximum rate of the SAU would be exceeded if the connection was accepted. This last condition can be written:

$$SR_j + BR_j + \sum_{k=1}^{m} SR_k + \sum_{k=1}^{m} BR_k \leq C_{SAU}$$

where $C_{SAU}$ is the maximum rate available to the SAU and there are m existing VCs (VC k for k=1, . . . , m) in the SAU and each VC k has static resource $SR_k$ and booked dynamic resource $BR_k$ reserved to them by the CAC.

A connection j that has been accepted is not restricted to requesting only $BR_j$. Any connection using the BoD can ask for $RR_j$ from the BoD controller which is less than, equal to or greater than $BR_j$ (but less than the maximum rate of the corresponding SAU). It should be noted that the dynamically requested $RR_j$ is in addition to the statically allocated $SR_j$. When $RR_j$ is greater than $BR_j$, connection j will be allocated at least rate $BR_j$ by the BoD controller. Connection j will have allocated to it $BR_j + BE_j^*$ where $BE_j^*$ is connection j's fair share of the best effort available capacity for the next period that the BoD controller will compute knowing the best effort needs $BE_j = \max(0, RR_j - BR_j)$ of all the requests made for that period, according to the following problem;

let J={$j_1$, . . . ,$j_p$} be the set of connections of the uplink under consideration requiring a non-zero BE (for the period under consideration). The fair and efficient rate to allocate to the connections belonging to J is the vector ($BE_{j_1}^*$, . . . , $BE_{j_p}^*$) solution of the following problem:

$$\text{Maximise} \prod_{j \in J} x_j$$

subject to the constraints
$$x_j \leq BE_j$$

$$\sum_{j \in J} x_j \leq C_A$$

and for all SAU K in the uplink having a VC j∈J, $$\sum_{j \in J \cap K} x_j \leq C_{A_K}$$

where $C_A$ is the rate remaining on the uplink after the CAC has allocated all the $SR_j$s, the BoD has allocated all of the $RR_j$ for each connection which does not exceed $BR_j$ and the BoD has allocated that part of the $RR_j$ which does not exceed $BR_j$ for each connection for which $RR_j$ exceeds $BR_j$;

that is if there are a total of M connections in the uplink $$C_A = C_T - \sum_{j=1}^{M} \min(RR_j, BR_j) - \sum_{j=1}^{M} SR_j$$

where $C_T$ is the total capacity of the uplink available for traffic.

and where $C_{A_K}$ is the rate remaining on the SAU K after the CAC has allocated all the $SR_j$s, the BoD has allocated all of the $RR_j$ for each connection which does not exceed $BR_j$ and the BoD has allocated that part of the $RR_j$ which does not exceed $BR_j$ for each connection for which $RR_j$ exceeds $BR_j$;

that is $$C_{A_K} = C_K - \sum_{j=1}^{M_K} \min(RR_j, BR_j) - \sum_{j=1}^{M_K} CR_j$$

where $C_K$ is the maximum rate of SAU K which has currently $M_K$ connections.

The allocation of best effort or BE rate is managed completely by the BoD controller.

As discussed above CAC is performed at call set up for all connections and is VC-based (eg. connection based) which means that CAC is performed for each VC but the allocation of resource on the uplink can either be VC based or group based. Also, as discussed above BoD can be performed on a VC-basis. However, as discussed below BoD does not have to be performed on a VC basis and, indeed, preferably is not VC based. Alternatively, BoD may be performed as a single operation for a group of VCs (eg. a group of connections) and so does not have to be done on a per VC basis, but may be done on a group of VCs. If BoD is performed on a VC basis it can become unwieldy and difficult to implement because of the large number of request messages which have to be sent to the BoD controller, ie. one set of messages per VC. When BoD is not VC based there is a further problem when integrating CAC and BoD functions because CAC is inherently VC based. Also the CAC and BoD have to have some means of mapping the VC based allocations and bookings made by the CAC to the group of VC (eg. SAU) based allocations made by the BoD and vice versa. This mapping can be set when the system is designed or may be dynamic as a result of communications between the CAC and the BoD.

In what follows, the BoD is not conducted on a VC basis but on a SAU basis, ie. the BoD allocates rate, relating to all the connections using BoD running on that SAU, to that SAU in a single operation in response to a request from the SAU, which request groups together the requirements of all the connections. When the SAU has more than one connection running it will itself allocate time-slots to a particular connection from the time-slots allocated to the SAU by the BoD controller. The CAC is assumed to allocate SR and BR on a VC basis. Thus, for a given period the BoD will give an SAU K requesting resource $RR_K$, (we assume that the SAU will always ask for an $RR_K \leq C_{A_K}$) either $$RR_K \text{ if } RR_K \leq \sum_{j=1}^{M_K} BR_j$$

Or $$\sum_{j=1}^{M_K} BR_j + BE_K^* \text{ if } RR_t > \sum_{j=1}^{M_K} BR_j \qquad (2)$$

where there are $M_K$ connections j (=1,2,3 ... $M_K$) per SAU K, and $BE_K^*$ is the SAU's fair share of the best effort rate available for the next period, which the BoD will compute knowing the best effort requirements of all SAUs.

If the headend has sufficient processing and buffer space then it can itself reshape traffic at its ingress to conform to the requirements for traffic at the ingress of the headend. In this case the CAC and BoD on the common medium uplink do not need to be strongly coupled with the process in the headend. In other words traffic entering the headend can be as bursty as necessary (as long as it conforms to its traffic descriptor) to achieve maximum utilisation of the common medium uplink, because the headend has sufficient processing and buffer space to transform the incoming bursty traffic into traffic which conforms to the requirements at the ingress of the headend. This means that the CAC and BoD for the uplink can be designed with only maximum utilisation of the common medium uplink in mind. There is no need to protect the headend. This case is discussed below. Thus the rate available for best-effort in the common medium uplink can be shared among current best effort requests without worrying about the impact of this sharing on the congestion in the buffers of the headend.

At the beginning of each period the BoD controller has to share among SAUs requesting best effort rate for the next period, the available capacity CA which is the rate remaining on the uplink after;

1. the $SR_j$ has been allocated to each connection continuing into or starting in the next period by the CAC, 2. for all the $RR_K$ that does not exceed the group booked rate, the $RR_K$ has been allocated to the SAUs by the BoD controller, and
3. for all the $RR_K$ that exceed the group booked rate, the group booked rate $$\sum_{j=1}^{M_K} BR_j$$

reserved to it by the CAC has been allocated to the SAUs by the BoD controller.

That is if there are a total of N active SAUs in the uplink (ie. with on going connections)

$$C_A = C_T - \sum_{j=1}^{N} \min(RR_K, BR_K) - \sum_{j=1}^{N} SR_K$$

Where $$SR_K = \sum_{j=1}^{M_k} SR_j \text{ and } BR_K = \sum_{j=1}^{M_K} BR_j$$

The BoD has to share the remaining available capacity $C_A$ between all the SAUs K requesting a non zero best effort resource $BE_K$ where $BE_K = \max(0, RR_K - BR_K)$. The BoD calculates for each period for each SAU K having a non zero $BE_K$ a best effort allocation $BE_K^*$ by solving the following problem;

let $H = \{h_1, \ldots, h_v\}$ be the set of SAUs of the uplink under consideration requiring a non-zero BE (for the period under consideration). The fair and efficient rate to allocate to the SAUs belonging to H is the vector $(BE_{h_1}^*, \ldots, BE_{h_v}^*)$ solution of the following problem:
Maximise $$\prod_{h \in H} x_h$$

subject to the constraints
$X_h \leq BE_h$ $$\sum_{h \in H} x_h \leq C_A$$

Alternatively, maximise the sum of the logs of $X_h$.

This optimisation problem may have additional constraints depending on other aspects of the network or the SAU.

In this example the connections requiring BoD have been grouped, for the BoD process, on a SAU basis. It should be noted this grouping could be subdivided, for example into a sub-set of connections from the same SAU that require BoD and that additionally have the same destination, or that additionally have the same ATM transfer capabilities or both.

In general where the common medium uplink is divided on a MF-TDMA basis, ie. into time-slots and frequency channels, most SAUs have the constraint that they cannot send information on more than one frequency channel simultaneously. In order to overcome this constraint the BoD controller computes $BE_t^*$ using the above optimisation procedure and then translates $BE_t^*$ into a number of time-slots. Then the BoD tries to allocate the time-slots to the SAUs so that the MF-TDMA constraints on SAUs are complied with. If, due to these constraints, some SAUs cannot use their full allocation of time-slots, then the BoD can allocate them to other SAUs.

A burst time plan (BTP), is the allocation table (AT) for the next period which is generated, for each period, by the BoD to show which VCs and/or groups of VCs are allocated which time-slots. To do this the CAC and BoD share the responsibility for preparing the allocation table and have to exchange information in order to generate the BTP. The CAC allocation table or CAT, is filled up by the CAC and then sent to the BoD which uses the CAT to create the allocation table (ie. The BTP). In creating the BTP, the BoD controller uses the CAT that the CAC sends to it periodically.

Every period, the BoD controller broadcasts on the downlink the full burst time plan for the corresponding uplink. The BTP will contain an ordered array of time-slot fields, with each field containing the identity of the BoD groups of VCs, if the time-slot has been allocated by the BoD or the identity of the individual VCs if the time-slot has been statically allocated by the CAC. Alternatively, the BTP could only contain the identities of groups if both the CAC and the BoD are group based.

For new connections arriving in the current period P based of the rate SR, the CAC computes the number of statically allocated time-slots (SATS) that must be allocated to the new VCs or their corresponding groups. Similarly, based on the rate BR, the CAC computes the number of booked time-slots (BATS) to be reserved. Next, the CAC updates the CAT with the newly allocated and booked time-slots after releasing the time-slots allocated and booked for connections that have just been released. This table is sent to the BoD controller periodically. Alternatively the CAT can be sent to the BoD controller on an event driven basis.

Hence, the CAC can use the CAT to de-allocate SATS and BATS for a connection that has been terminated (or for the corresponding group) and to allocate SATS and BATS for new connections (or for the corresponding group). All these activities take effect only when the corresponding BTP created by the BoD from the CAT are received by the terminals.

Thus, the CAT comprises at the beginning of a given period, the current view of the uplink CAC of the status of the time-slots in the next period. Each time-slot (TS) in the CAT can be unused, SATS or BATS. The CAT time-slots that are SATS have been assigned by the CAC for the next period and the BATS have been pre-allocated but not allocated. Each SATS or BATS has an identifier for the connection (or group of connections) that owns it. If necessary the BoD can make a transformation replacing the CAT identifier of the BATS and possibly the SATS with another identifier.

A new connection is accepted by the uplink CAC only if the connection's required SATS and BATS can be assigned to currently unused time-slots in the CAT while respecting constraints on the SAUs, eg. MF-TDMA constraints. Note that where SAU constraints are not complied with, for example, because there is no way not to allocate two time slots simultaneously on different channels to the same SAU while there is in principle enough time slots to accept the connection, the CAT may be rearranged to move some of the allocated time-slots to a different time. Hence, the CAT may be re-arranged from time to time. This is a system design choice.

Designing the CAC and BoD so that they each perform separate defined functions enables the CAC controller and the BoD controller to be located in different locations on the network or enable improved scalability when they are co-located. In the case of a satellite network, both controllers could be co-located in a ground based NCC, or the CAC controller could be located in the ground based NCC with the BoD controller located in the satellite.

Once the overall CAC decides to grant admission to connection j, a virtual path identifier (VPI) and a virtual channel identifier (VCI) are assigned to connection j and the SAU is informed of this VPI/NCI and that connection j has been granted admission to the network. The CAC also informs the BoD controller by communicating to it the identifiers of all the new connections (and possibly all the terminated connections) once each period at the same time as it sends the CAT. When the BoD controller receives at the beginning of a period the identifiers for all newly set-up connections j, possibly the identifiers of the connections that have been terminated and the CAT, it can enter into a BoD computation phase, in which it allocates all the dynamic resource taking into account the SATS and the BATS in the CAT and then can create a BTP that is sent to all the SAUs sharing the same uplink.

Figure 1:
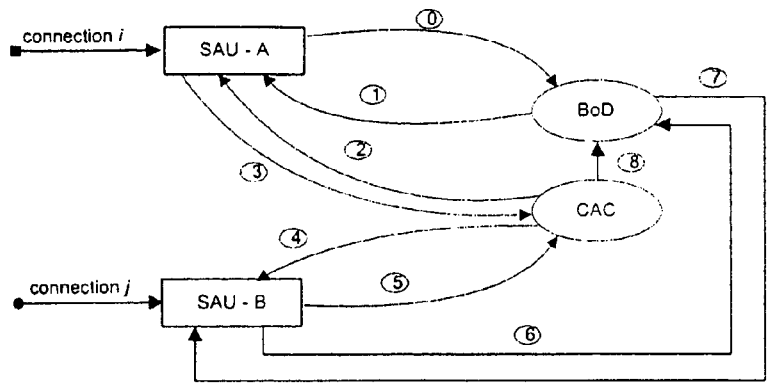
FIG. 1 is a diagram showing the network connections between a SAU, a CAC and a BoD.
Figure 2:
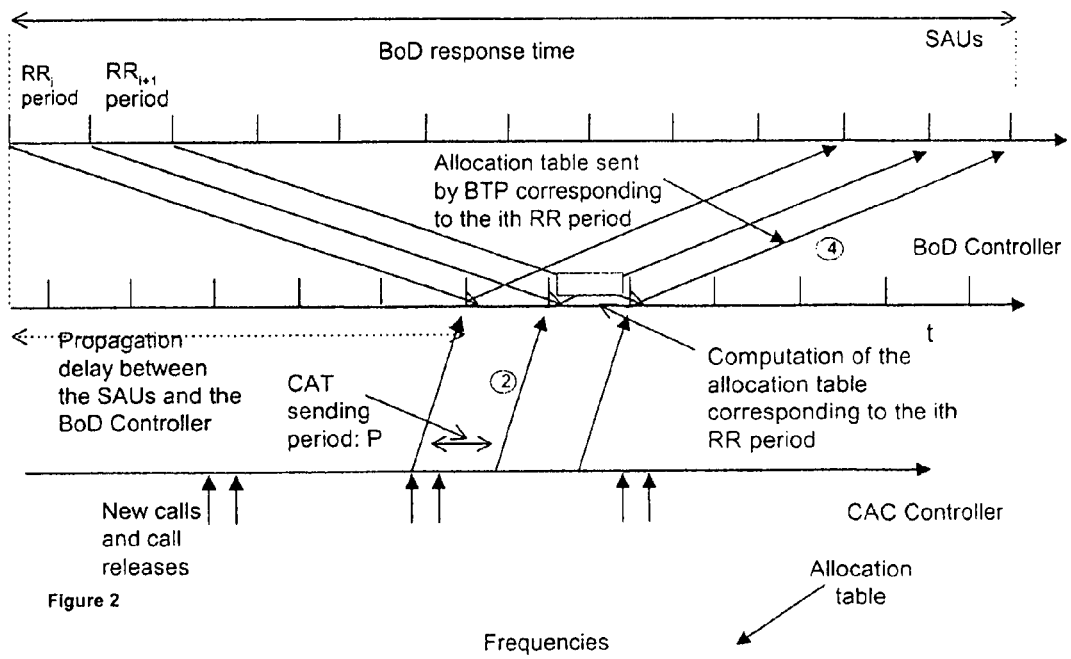
FIG. 2 shows the periodic timing of the processing conducted by the CAC and the BoD.

FIG. 2 illustrates the coupling between the CAC and BoD controllers. The periodicity of the CAC/BoD process should be chosen to minimise overhead, to deliver a good efficiency and to allow acceptable timing at connection set-up and acceptable reactiveness of the BoD Protocol.

A stream of traffic passing through a multiple access uplink will almost certainly be transformed, in terms of its traffic descriptor by this passage.

If there are few constraints on the buffer space and processing space in the headend then the CAC in the headend and the CAC/BoD for the uplink can be kept separate so that CAC/BoD receiving traffic having traffic descriptor X, allocates time-slots on the uplink in the most optimised manner as discussed above. The consequence of this may be to transform the traffic into traffic which could be less smooth than the original one and having traffic descriptor L. Then in order not to create any problem in the headend, the headend will have to re-shape traffic having descriptor L as its ingress to conform to the traffic descriptor X.

If the headend is constrained, eg. as in the case of a satellite, then reshaping cannot be performed in the headend, so that the CAC/BoD for the uplink, at the cost perhaps of full optimisation of time-slot allocation, is designed to create a cell stream, with a traffic descriptor that can be accepted by the headend. If a connection traffic descriptor X is very bursty and the headend has very low buffer space, there is a high probability that it will not be accepted by the CAC in the headend. But particularly if this traffic is not real time, it could be transformed into traffic having a descriptor $K_x$, which is smoother and less bursty that would allow the CAC in the headend to accept it with a higher probability. Thus, the CAC decision in the headend can be based on $K_x$ as long as the CAC/BoD on the uplink can transform connections having traffic descriptor X into traffic conforming to traffic descriptor $K_x$. If the thus transformed traffic goes through a gateway to another part of the network, the gateway might have to transform the traffic again so that it conforms once more with the original traffic descriptor X. If the traffic goes directly to another SAU, then that SAU has to be informed that it will receive something that corresponds to $K_x$. Note that the transformation $X \Rightarrow K_x$ and the subsequent transformation $K_x \Rightarrow X$ will involve delaying some cells.

If the traffic with descriptor X is real-time, then the CAC/BoD on the uplink may only be able to accept the traffic by transforming it into traffic with a descriptor $K_x$ which is less smooth than X.

Three examples of such traffic shaping by the CAC and BoD are given below:

1. If connection i is CBR (Constant Bit Rate), which is real-time, then the BoD controller may not be used if propagation delay is large. If the delay constraints for i are very tight, then the uplink CAC/BoD might have to transform connection i into a CBR of PCR (Peak Cell Rate) greater than the one declared by connection i.
2. If connection i is rt-VBR (real time variable bit rate) then the uplink CAC will transform connection i having traffic descriptor X into a connection j having traffic descriptor $K_x$ not conforming to the traffic descriptor X. Connection i could be transformed into a CBR of $PCR_j > SCR_i$. The headend CAC has then to accept i based on $PCR_j$.
3. If connection i is nrt-VBR, then the CAC/BoD could transform connection i without effecting its QoS. Then this should be done in a way that helps the CAC in the headend. An extreme example would be to transform connection i into a $CBR_j$ of $PCR_j = SCR_i$ (eg. $SR_i = SCR_i$).

This will not by itself avoid congestion in the headend, since it does not take into account the allocation of best effort time-slots. If the BoD controller allocates time-slots without taking into account the state of the buffers in the headend, there remains the possibility of congestion which at the very best would then mean the discarding of best effort cells that have been sent on the shared uplink at the high cost. Thus, to avoid congestion the SAUs can make sure that each connection conforms to the traffic requirements of the CAC in the headend. However, this does not solve the problem for connections which rely mostly on best effort, as best effort traffic (ie. on top of booked rate) is not subject to the CAC process.

So the trade-off is to allocate best-effort resource independently on each uplink and accept a potential large loss rate in the headend buffers (because they are small) or control more globally the sharing of best effort resources among all the uplinks. The first solution is 'best effort' in its philosophy but means that the uplink resources that are expensive and scarce may be used sub-optimally (ie, used for traffic that has a high probability of being discarded). The second solution is potentially much more efficient but is also much more complex. The following explains this second solution. To solve this problem the computation of the fair share of best effort rate in one common medium uplink is co-ordinated with all the other uplinks arriving at the headend as well as all the downlinks from the headend (assuming there is only one headend).

In order to co-ordinate the BoD on all the uplinks of a given headend with all its downlinks to avoid congestion when the buffer space for each downlink is very limited, rate allocation is performed as discussed below. This will allow the CAC process in the headend to be performed based only on static rate and booked rate in the uplink since all the best effort resource will be well regulated.

A request for a best effort resource, ie. an RR, has to be done on behalf of a group of VCs from the same SAU (operating on an uplink) destined for the same downlink or a subset of this grouping of VCs. That is requests for resource have to be made in such a way that the BoD controller knows for which downlink the request is for. This grouping of VCs is referred to below as a user.

Let the headend have M uplinks and M downlinks where $u_i$ is uplink i where $1 \leq i \leq M$ and $d_j$ is the downlink j ($1 \leq i \leq M$), let x be the best effort rate that should be allocated to a user on top of its aggregated static rate SR and booked rate BR for the next period knowing the requested best effort rate BE for the next period of each of the users in all the uplinks and downlinks. If the BoD controller is centralised for all the uplinks and downlinks and if there is only one headend, the best effort rates x* to allocate to each user can be computed as follows.

In the current period, there are $n_{ij}$ requests made for the next period for $d_j$ from $u_i$. Let $BE_t^{ij}$ ($1 \leq t \leq n_{ij}$) be the non zero best effort request from best-effort user t of uplink i for downlink j (for $1 \leq i,j \leq M$). Then the capacity available for best effort within each uplink i ($C_{Ai}$) and the capacity available for best effort within each downlink j ($D_{Aj}$) has to be shared in an efficient and fair way between the users. $C_{Ai}$ can be computed as detailed above for $C_A$ for each uplink i of the headend. The capacity available for a given downlink j for the next period is:

$$D_{Aj} = C_{Dj} - \sum_{i=1}^{M} \sum_{k} \left( SR_k + \min\left( RR_t^{ij}, \sum_{v \in entity1} BR_v \right) \right) \Im(k \in u_i) \Im(k \in d_j)$$

Where $C_{Dj}$ is the total capacity of $d_j$ and $\Im(\ )$ is the indicator function, ie. $\Im(x)=1$ if x is true and otherwise zero.

The allocation of rate $X_k^{ij*}$ to user k in uplink i, for downlink j is calculated as follows:
maximize $$\sum_{i=1}^{M} \sum_{j=1}^{M} \sum_{k=1}^{n_{ij}} \operatorname{Ln}(x_k^{ij})$$

subject to the following 3 sets of constraints:
1. $x_k^{ij} \leq BE_k^{ij}$,
2.

$$\sum_{i=1}^{M} \sum_{k=1}^{n_{ij}} x_k^{ij} \leq D_{Aj}$$

for all the downlinks j,
3.

$$\sum_{j=1}^{M} \sum_{k=1}^{n_{ij}} x_k^{ij} \leq C_{Ai}$$

for all the uplinks i, $$\sum_{j=1}^{M} \sum_{\substack{k=1 \\ k \in temp}}^{n_{ij}} x_k^{ij} \leq C_{A_p}$$

for all terminals p in all beams i.

What is claimed is:

1. An integrated connection admission control (CAC) and bandwidth on demand control (BoD) system for allocating the resource of a common medium uplink of a multiple access (MA) asynchronous network segment, wherein:
    the CAC comprises means for allocating static resource to all virtual connections (VCs) or groupings of VCs accepted by the CAC and means for booking dynamic resource to the VCs or groupings of VCs that require guaranteed dynamic resource, and
    the BoD comprises means for allocating dynamic resource to VCs or to groupings of VCs requesting dynamic resource in such a way that all VCs or groupings of VCs requesting dynamic resource are dynamically allocated requested dynamic resource up to at least the guaranteed dynamic resource which has been booked for the by the CAC, wherein the system comprises an allocation table setting out resource allocation on the common medium access uplink which is controlled by the CAC when allocating static resource and booking dynamic resource and is controlled by the BoD when allocating dynamic resource.

2. A system according to claim 1 wherein the groupings of VCs are within the same subscriber access unit (SAU) or terminal.

3. A system according to claim 1 wherein the means for allocating static resource in the CAC allocates static resource to a VC when a VC is set up for the duration of the connection associated with the VC.

4. A system according to claim 1 wherein the means for booking dynamic resource in the CAC reserves booked dynamic resource to a VC when a VC is set up for the duration of the connection associated with the VC.

5. A system according to claim 1 wherein the means for allocating static resource in the CAC allocates static resource to a group of VCs and changes the amount of static resource allocated to a group of VCs when new connections are set up or connections are released within the group.

6. A system according to claim 1 wherein the means for booking dynamic resource in the CAC books dynamic resource to a group of VCs and changes the amount of booked resource allocated to a group of VCs when new connections are set up or connections are released within the group.

7. A system according to claim 1 wherein the CAC comprises means for accepting a VC j requiring a static resource of $SR_j$ and a booked dynamic resource of $BR_j$ when;

$$SR_j + BR_j + \sum_{K=1}^{K} SR_k + \sum_{K=1}^{K} BR_k \leq C_T$$

where $C_T$ is the total resource capacity of the common medium uplink and there are K existing VCs using the uplink and each of the K VCs have been reserved static resource $SR_k$ and booked dynamic resource $BR_k$ by the CAC.

8. A system according to claim 1 wherein the CAC comprises means for accepting a VC j requiring a static resource of $SR_j$ and a booked resource of $BR_j$ when;

$$SR_j + BR_j + \sum_{K=1}^{m} SR_k + \sum_{K=1}^{m} BR_k \leq C_{SAU}$$

where $C_{SAU}$ is the maximum rate available to a subscriber access unit (SAU) or terminal and there are m existing VCs (VC K for k=1, . . . , m) in the SAU or terminal and each VC k has static resource $SR_k$ and a booked dynamic resource $BR_k$ reserved to them by the CAC.

9. A system according to claim 1 wherein the means for allocating static resource in the CAC allocates static resource and the means for allocating dynamic resource in the BoD allocates dynamic resource on a periodic basis.

10. A system according to claim 1 wherein the means for allocating static resource in the CAC allocates static resource and the means for allocating dynamic resource in the BoD allocates dynamic resource on a periodic basis and during a current period the means for allocating static resource in the CAC allocates resource for new VCs and de-allocates resource from released VCs for the next period and the means for allocating dynamic resource in the BoD allocates dynamic resource for the next period to VCs or groups of VCs requesting dynamic resource for the next period.

11. A system according to claim 1 wherein the means for allocating static resource in the CAC and the means for allocating dynamic resource in the BoD allocate resource on a periodic basis and the allocations made by the BoD for the next period are Independent for the allocations made by the BoD for the current period.

12. A system according to claim 1 wherein the means for allocating static resource in the CAC and the means for allocating dynamic resource in the BoD allocate resource on a periodic basis and the allocations made by the BoD for the next period are dependent on the allocations made by the BoD for the current period.

13. An integrated connection admission control (CAC) and bandwidth on demand control (BoD) system for allocating the resource of a common medium uplink of a multiple access (MA) asynchronous network segment, wherein:

the CAC comprises means for allocating static resource to all virtual connections (VCs) or groupings of VCs accepted by the CAC and means for booking dynamic resource to the VCs or groupings of VCs that require guaranteed dynamic resource, and the BoD comprises means for allocating dynamic resource to VCs or to groupings of VCs requesting dynamic resource according to the following rules:

when the requested resource from the VC or group of VCs is less than or equal to the booked dynamic resource for the VC or group of VCs, the BoD allocates the VCs all of the requested resource, when the requested resource from the VC or group of VCs is greater than the booked dynamic resource for the VC or group of VCs, the BoD allocates the VC or group of VCs the booked dynamic resource and additionally the BoD allocates the VC or group of VCs a share of the remainder of the requested resource, from the remaining resource capacity of the common medium uplink wherein the system comprises an allocation table setting out resource allocation on the common medium access uplink which is controlled by the CAC when allocating static resource and booking dynamic resource and is controlled by the BoD when allocating dynamic resource.

14. A system according to claim 13 wherein the means for allocating dynamic resource in the BoD allocates the share of the remainder of the requested resource, referred to herein as the best effort resource, BE, for each VC or group of VCs, by maximising the sum of the natural logarithms or all the BEs subject to the conditions that;

the BE allocated to each VC or group of VCs is less than or equal to the remainder of the requested resource for that VC or group of VCs, and the sum of all the allocated BEs is less than or equal to the remaining resource capacity of the common medium uplink.

15. A system according to claim 13 wherein the means for allocating dynamic resource in the BoD allocates the share of the remainder of the requested resource, referred to herein as the best effort resource, BE, for each VC or group of VCs, by maximising the product of all the BEs, subject to the conditions that;

the BE allocated to each VC or group of VCs is less than or equal to the remainder of the requested resource for that VC or group of VCs, and the sum of all the allocated BEs is less then or equal to the remaining resource capacity of the common medium uplink.

16. A system according to claim 13 wherein there are multiple uplinks and multiple downlinks controlled by the BoD for a single headend and the means for allocating dynamic resource in the BoD allocates the share of the remainder of the requested resource referred to herein as the best effort resource, BE, for each VC or group of VCs, by maximising the sum of the natural logarithms of all the BEs, subject to the conditions that;

The BE allocated to each VC or group of VCs is less than or equal to the remainder of the requested resource for that VC or group of VCs, and The sum of all the allocated BEs is less than or equal to the remaining resource capacity of the uplink, for each uplink, and The sum of all the allocated BEs is less than or equal to the remaining resource capacity of the downlink, for each downlink.

17. A system according to claim 1 wherein which has an allocation table setting out resource allocation on the common medium access uplink wherein the allocation table is controlled by the means for allocating static resource in the CAC when static resource is allocated and is controlled by the means for allocating dynamic resource in the BoD when dynamic resource is allocated.

18. A system according to claim 1 wherein which has an allocation table setting out resource allocation on the common medium access uplink which allocation is controlled by the means for allocating static resource in the CAC when static resource is allocated and is controlled by the means for allocating dynamic resource in the BoD when dynamic resource is allocated wherein the means for allocating static resource and for booking dynamic resource in the CAC periodically allocates resource and books resource in the table and forwards the table to the BoD for the means for allocating dynamic resource in the table.

19. A system according to claim 1 wherein the means for allocating static resource in the CAC and the means for allocating dynamic resource in the BoD are constrained to allocate resource in such a way that traffic on the common medium access uplink is shaped by the integrated CAC and BoD resource allocation system.

20. An integrated connection admission control (CAC) and bandwidth an demand control (BoD) system for allocating the resource of a common medium uplink of a multiple access (MA) asynchronous network segment, wherein the CAC comprises means for allocating static resource and means for booking dynamic resource and the BoD comprises means for allocating dynamic resource and the system comprises an allocation table setting out resource allocation on the common medium access uplink which is controlled by the CAC when allocating static resource and booking dynamic resource and is controlled by the BoD when allocating dynamic resource.

21. A system according to claim 20 wherein the means for allocating static resource and booking dynamic resource in the CAC periodically allocates resource and books resource in the table and forwards the table to the BoD for the means for allocating dynamic resource in the BoD to allocate dynamic resource in the table.

22. A method of integrating connection admission control (CAC) and bandwidth on demand control (BoD) system for allocating the resource of a common medium uplink of a multiple access (MA) asynchronous network segment, comprising the steps of:
the CAC allocating static resource to all virtual connections (VCs) accepted by the CAC on a per VC or per group of VCs basis,
the CAC booking dynamic resource to the VCs that require guaranteed dynamic resource on a per VC or per group of VCs basis, and
the BoD allocating dynamic resource to VCs or to groupings of VCs requesting dynamic resource in such a way that all VCs or groupings of VCs requesting dynamic resource are dynamically allocated requested dynamic resource up to at least the guaranteed dynamic resource which has been booked for them by the CAC, and
additionally comprising the steps of filling out an allocation table setting out resource allocation on the common medium access uplink in such a way that the table is controlled by the CAC when allocating static resource and booking dynamic resource and is controlled by the BoD when allocating dynamic resource.

23. A method according to claim 22 in which the CAC allocates static resource to a VC when a VC is set up for the duration of the connection associated with the VC.

24. A method according to claim 22 in which the CAC reserves booked dynamic resource to a VC when a VC is set up for the duration of the connection associated with the VC.

25. A method according to claim 22 wherein the groupings of VCs are within the same subscriber access unit (SAU) or terminal.

26. A method according to claim 22 wherein the CAC allocates static resource to a group of VCs and changes the amount of static resource allocated to a group of VCs when new connections are set up or connections are released within the group.

27. A method according to claim 22 wherein the CAC books dynamic resource to a group of VCs and changes the amount of booked resource allocated to a group of VCs when new connections are set up or connections are released within the group.

28. A method according to claim 22 in which the CAC accepts a VC j requiring a static resource of $SR_j$ and a booked dynamic resource of $BR_j$ only if;

$$SR_j + BR_j + \sum_{K=1}^{K} SR_k + \sum_{K=1}^{K} BR_k \leq C_T$$

where $C_T$ is the total resource capacity of the common medium uplink and there are K existing VCs using the uplink and each of the K VCs have been reserved static resource $SR_k$ and booked dynamic resource $BR_k$ by the CAC.

29. A method according to claim 22 wherein the CAC comprises means for accepting a VC j requiring a static resource of $SR_j$ and a booked resource of $BR_j$ when;

$$SR_j + BR_j + \sum_{K=1}^{m} SR_k + \sum_{K=1}^{m} BR_k \leq C_{SAU}$$

where $C_{SAU}$ is the maximum rate available to a subscriber access unit (SAU) or terminal and there are m existing VCs (VC K for k=1, ..., m) in the SAU or terminal and each VC k has static resource $SR_k$ and a booked dynamic resource $BR_k$ reserved to them by the CAC.

30. A method according to claim 22 in which the CAC allocates static resource and the BoD allocates dynamic resource on a periodic basis.

31. A method according to claim 22 in which the CAC allocates static resource and the BoD allocates dynamic resource on a periodic basis and wherein during a current period the CAC allocates resource for hew VCs and de-allocates resource from released VCs for the next period and the BoD allocates dynamic resource for the next period to VCs or groups of VCs requesting dynamic resource for the next period.

32. A method according to claim 22 in which the CAC allocates static resource and the BoD allocates dynamic resource on a periodic basis and in which during a current period the CAC allocates resource for new VCs and de-allocates resource from released VCs for the next period and the BoD allocates dynamic resource for the next period wherein the allocations made by the BoD for the next period are independent of the allocations made by the BoD for the current period.

33. A method according to claim 22 in which the CAC allocates static resource and the BoD allocates dynamic resource on a periodic basis and in which during a current period the CAC allocates resource for new VCs and do-allocates resource from released VCs for the next period and the BoD allocates dynamic resource for the next period to VCs or groups of VCs requesting dynamic resource for the next period wherein the allocations made by the BoD for the next period are dependent on the allocations made by the BoD for the current period.

34. A method according to claim 22 in which the BoD allocates dynamic resource to VCs or to groups of VCs requesting dynamic resource according to the following rules:
when the requested resource from the VC or group of VCs is less than or equal to the booked dynamic resource for the VC or group of VCs, the BoD allocates the VCs all of the requested resource, and when the requested resource from the VC or group of VCs is greater than the booked dynamic resource for the VC or group of VCs, the BoD allocates the VC or group of VCs the booked dynamic resource and additionally the BoD allocates the VC or group of VCs a share of the remainder of the requested resource, from the remaining resource capacity of the common medium uplink.

35. A method according to claim 22 in which the BoD allocates dynamic resource to VCs or to groups of VCs requesting dynamic resource according to the following rules:

when the requested resource from the VC or group of VCs is less than or equal to the booked dynamic resource for the VC or group of VCs, the BoD allocates the VCs all of the requested resource, when the requested resource from the VC or group of VCs is greater than the booked dynamic resource for the VC or group of VCs, the BoD allocates the VC or group of VCs the booked dynamic resource and additionally the BoD allocates the VC or group of VCs a share of the remainder of the requested resource, from the remaining resource capacity of the common medium uplink, and in which the share of the remainder of the requested resource, herein referred to as the best effort resource, BE, for each VC or group of VCs, is allocated by maximising the sum of the natural logarithms or all the BEs, subject to the conditions that;

the BE allocated to each VC or group of VCs is less than or equal to the remainder of the requested resource for that VC or group of VCs, and the sum of all the allocated BEs is less than or equal to the remaining resource capacity of the common medium uplink.

36. A method according to claim 22 in which the BoD allocates dynamic resource to VCs or groups of VCs according to the following rules;

when the requested resource from the VC or group of VCs is less than or equal to the booked dynamic resource for the VC or a group of VCs, the BoD allocates the VC or group of VCs all of the requested resource, and when the requested resource from the VC or group of VCs is greater than the booked dynamic resource for the VC or group of VCs, the BoD allocates the VC or group of VCs the booked dynamic resource and additionally the BoD allocates the VC or group of VCs a share of the remainder of the requested resource, from the remaining resource capacity of the common medium uplink, and in which the share of the remainder of the requested resource, herein referred to as the best effort resource, BE, for each VC or group of VCs, is allocated by maximising the product of all the BEs, subject to the conditions that;

the BE allocated to each VC or group of VCs is less than or equal to the remainder of the requested resource for that VC or group of VCs, and the sum of all the allocated BEs is less than or equal to the remaining resource capacity of the common medium uplink.

37. A method according to claim 22 in which there are multiple uplinks and multiple downlinks controlled by the BoD for a single headend in which the BoD allocates dynamic resource to VCs or groups or VCs according to the following rules;

when the requested resource from the VC or group of VCs is less than or equal to the booked dynamic resource for the VC or group of VCs, the BoD allocates the VCs all of the requested resource, when the requested resource from the VC or group of VCs is greater than the booked dynamic resource for the VC or group of VCs, the BoD allocates the VC or group of VCs the booked dynamic resource and additionally the BoD allocates the VC or group of VCs a share of the remainder of the requested resource, from the remaining resource capacity of the common medium uplink, and in which the share of the remainder of the requested resource, herein referred to as the best effort resource, BE, for each VC or group of VCs, is allocated by maximising the sum of the natural logarithms or all the BEs, subject to the conditions that;

the BE allocated to each VC or group of VCs is less than or equal to the remainder of the requested resource for that VC or group of VCs, and the sum of all the allocated BEs is less than or equal to the remaining resource capacity of the common medium uplink.

38. A method according to claim 22 in which an allocation table setting out resource allocation on the common medium access uplink is controlled by the CAC when the CAC Is allocating static resource and booking dynamic resource and is controlled by the BOD when the BOD is allocating dynamic resource.

39. A method according to claim 22 in which an allocation table setting out resource allocation on the common medium access uplink is controlled by the CAC when the CAC Is allocating static resource and booking dynamic resource and is controlled by the BoD when the BoD is allocating dynamic resource wherein the CAC periodically allocates resource and books resource in the table and forwards the table to the BoD to allocate dynamic resource in the table.

40. A method according to claim 22 wherein the CAC and BoD are constrained to allocate resource in such a way that traffic on the common medium access uplink is shaped by the integrated CAC and BoD resource allocation system.

41. A method of integrating connection admission control (CAC) and bandwidth on demand control (BoD) system for allocating the resource of a common medium uplink of a multiple access (MA) asynchronous network segment, comprising the steps of the CAC allocating static resource and booking dynamic resource and the BoD allocating dynamic resource and additionally comprising the steps of filling out an allocation table setting out resource allocation on the common medium access uplink in such a way that the table is controlled by the CAC when allocating static resource and booking dynamic resource and is controlled by the BoD when allocating dynamic resource.

42. A method according to claim 41 in which the CAC periodically allocates resource and books resource in the table and forwards the table to the BoD to allocate dynamic resource in the table.

\* \* \* \* \*